United States Patent
Kiefer et al.

[15] 3,653,743
[45] Apr. 4, 1972

[54] ELECTRO-OPTIC DEVICES WITH ACOUSTO-OPTIC EFFECT SUPPRESSION

[72] Inventors: James E. Kiefer, Canoga Park; Francis E. Goodwin, Malibu, both of Calif.

[73] Assignee: Hughs Aircraft Company, Culver City, Calif.

[22] Filed: Nov. 23, 1970

[21] Appl. No.: 91,625

[52] U.S. Cl. .............................. 350/150, 350/149, 350/161
[51] Int. Cl. ........................................................ G02f 1/26
[58] Field of Search ............. 350/147, 149, 150, 157, 160, 350/161

[56] References Cited

UNITED STATES PATENTS 3,572,897   3/1971   Bousky ................................. 350/160

*Primary Examiner*—David Schonberg
*Assistant Examiner*—Paul R. Miller
*Attorney*—W. H. MacAllister, Jr. and Paul M. Coble

[57] ABSTRACT

Acousto-optic resonances in a crystal of a material exhibiting the linear electro-optic effect may be suppressed by coupling to the respective lateral faces of the crystal a plurality of slabs of a material having high acoustic energy absorption properties and an acoustic impedance substantially matching the acoustic impedance of the crystal. Lead, lead glass or titanium are exemplary appropriate acoustic energy absorbing materials for gallium arsenide or cadmium telluride crystals. A layer of either a non-bonding acoustic energy coupling material (such as silicone grease or indium), or a coupling and bonding material (such as shellac) is disposed between each absorbing slab and the adjacent crystal face.

7 Claims, 5 Drawing Figures

3,653,743

James E. Kiefer,
Francis E. Goodwin
INVENTORS.
BY.

*Paul M. Coffee*

ATTORNEY.

ELECTRO-OPTIC DEVICES WITH ACOUSTO-OPTIC EFFECT SUPPRESSION

This invention relates to optical devices, and more particularly relates to an arrangement for suppressing acousto-optic resonances in crystals of electro-optic material.

When certain crystals are placed in an electric field, a linear electro-optic effect occurs wherein the crystal indices of refraction for plane polarized light in orthogonal planes are altered by an amount directly proportional to the strength of the applied electric field. This linear electro-optic effect, also known as the Pockels effect, is often utilized in optical shutters and modulators.

Since linear electro-optic materials are also piezo-electric, when such a material is subjected to an electric field, strain is induced in the material due to its piezo-electric nature. The perturbation of the birefringence of the material caused by this strain is termed the "piezo-optic," or "acousto-optic," effect and is of the same character as, and is additive with, the electro-optic effect. As a result of this acousto-optic effect, distortions of the optical transfer characteristics of electro-optic devices occur when electrically excited at a frequency near a natural acoustic resonant frequency of the electro-optic material.

Prior art attempts to suppress the acousto-optic effect in electro-optic devices have involved utilizing electro-optic crystals of an irregular shape in order to alter the acoustic resonance characteristics of the crystal, and mechanically clamping the crystal with sufficient pressure to prevent it from responding to an exciting field at its resonant frequencies. These schemes have not achieved sufficient acousto-optic resonance suppression so as to be practical for certain electro-optic applications. Moreover, in mechanically clamped suppression arrangements the applied pressure is sometimes of sufficient magnitude that the crystal is excessively strained, thereby distorting its electro-optic response characteristics.

Accordingly, it is an object of the present invention to provide an electro-optic device with an arrangement for suppressing the acousto-optic effect in the electro-optic crystal to a greater degree than has been heretofore achieved in a practical device.

It is a further object of the present invention to provide an acousto-optic effect suppression arrangement for an electro-optic device wherein excellent acousto-optic resonance suppression is achieved without impairing the electro-optic response characteristics of the device.

In accordance with the invention, a plurality of bodies of acoustic energy absorbing material are disposed adjacent to the respective lateral faces of a crystal of a material exhibiting the linear electro-optic effect. Each absorbing body has an acoustic impedance substantially matching the acoustic impedance of the electro-optic crystal. A layer of acoustic energy coupling material, which may also function as a bonding agent, is disposed between each absorbing body and the adjacent lateral face of the crystal. An electric field may be applied across the crystal between a pair of opposite lateral faces of the crystal.

Additional objects, advantages and characteristic features of the present invention will become readily apparent from the following detailed description of preferred embodiments of the invention when considered in conjunction with the accompanying drawings wherein.

Figure 3A:
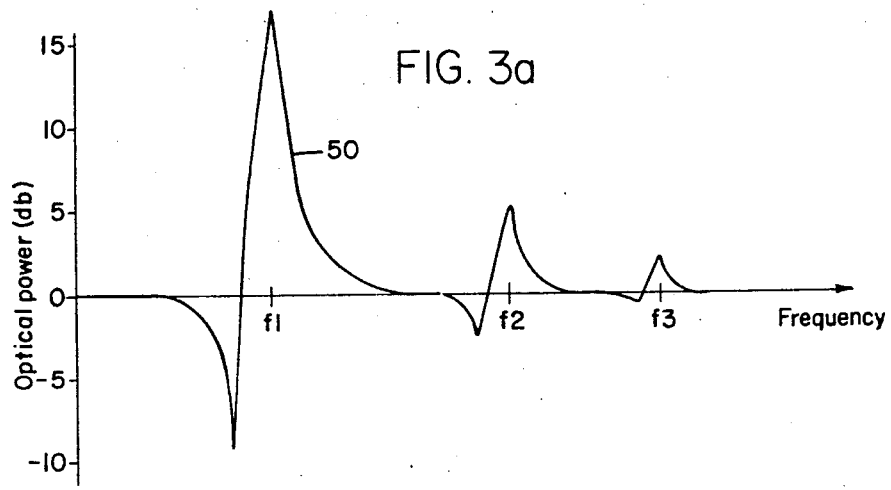

FIGS. 3(a), 6b) and (c) are graphs containing respective curves illustrating the output optical power as a function of the frequency of an applied electric field for an electro-optic device with no acousto-optic effect suppression, with acousto-optic effect suppression according to the prior art, and with acousto-optic effect suppression according to the present invention.

Figure 1:
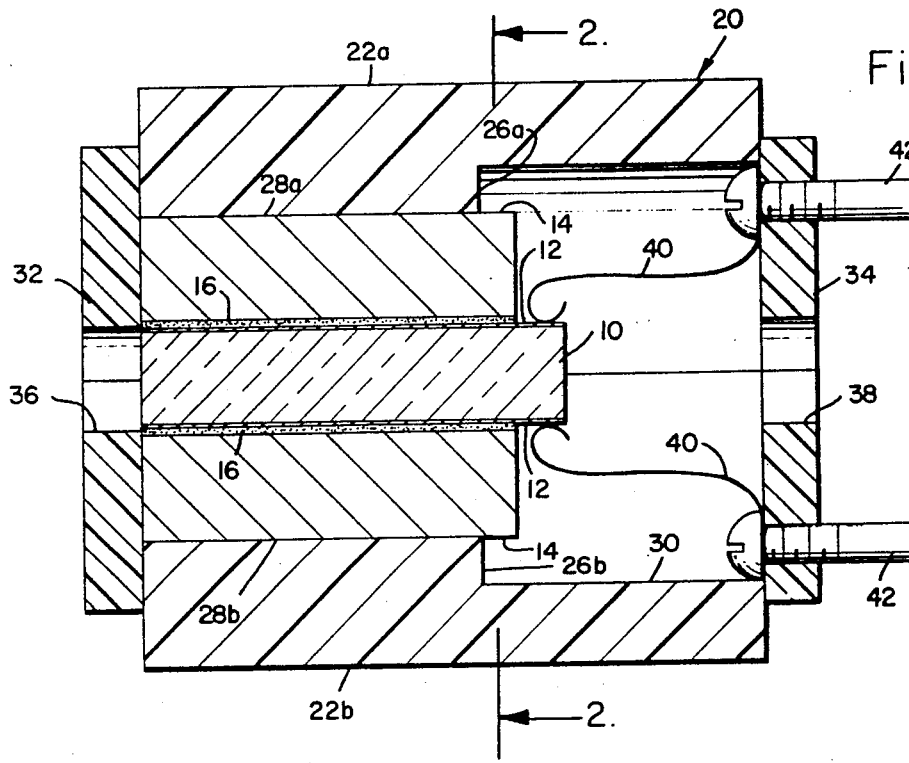
FIG. 1 is a longitudinal sectional view illustrating an acousto-optic effect suppression arrangement according to the invention.
Figure 2:
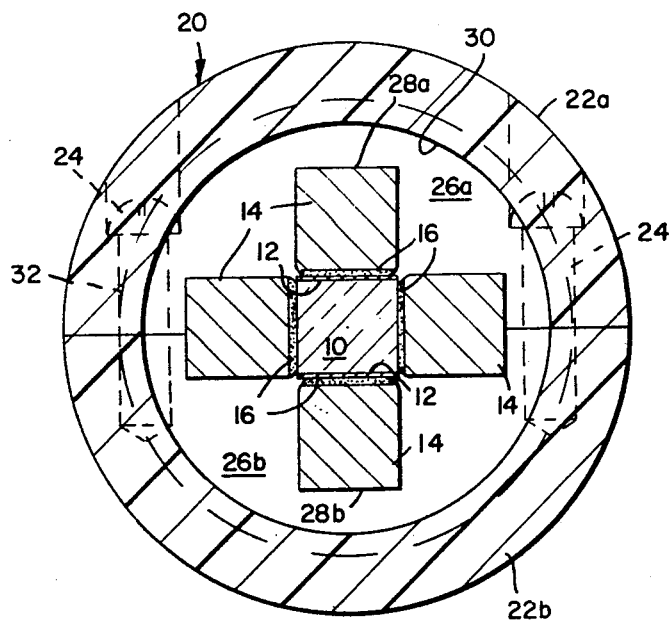
FIG. 2 is a cross-sectional view taken along line 2—2 of FIG. 1.

Referring to FIGS. 1 and 2 with greater particularity, an arrangement is shown for suppressing the acousto-optic effect in a crystal 10 of a material exhibiting the electro-optic effect. Exemplary crystal materials exhibiting this effect include but are not limited to include gallium arsenide (GaAs), cadmium telluride (CdTe), potassium dihydrogen phosphate (KDP), potassium dideuterium phosphate (KD*P), ammonium dihydrogen phosphate (ADP), copper chloride (CuCl), zinc sulphide (ZnS), zinc telluride (ZnTe), lithium niobate (LiNbO$_3$), lithium iodate (LiIO$_3$), lithium tantalate (LiTaO$_3$), barium titanate (BaTiO$_3$), and quartz. For purposes of illustration, the following discussion of a specific embodiment of the invention will be made with respect to a crystal 10 of gallium arsenide having a square cross-section and of exemplary dimensions 1 cm × 1 cm × 5 cm.

In order to apply an electric field across the crystal 10 for electro-optic applications, a pair of opposite lateral faces of the crystal 10 are provided with a thin coating 12 of electrically conductive material. The coating 12 may be of a metal such as gold and may have a thickness of around 0.001 inch, for example.

A plurality of slabs 14 of a material having high acoustic energy absorption properties are disposed adjacent to respective lateral faces of the electro-optic crystal 10, each slab 14 having a planar (Optically flat) surface disposed parallel to the adjacent crystal face. The acoustic energy absorbing slabs 14 preferably have essentially the same cross-sectional dimensions as the crystal 10 and a length slightly less than that of the crystal 10. This enables almost all of the lateral crystal surfaces to be coupled to acoustic energy absorbing material while leaving a small portion of each electrically conductive layer 12 exposed in order to facilitate the making of electrical contact with the conductive layers 12.

The acoustic energy absorbing slabs 14 are selected to have an acoustic impedance which substantially matches the acoustic impedance of the crystal 10. The acoustic impedance of a material is given by the product of the density of the material and the velocity of sound in the material. Acoustic characteristics enabling computation of the acoustic impedance for various materials are given in Table 3f-2 on pages 3–88 of the American Institute of Physics Handbook, McGraw Hill Book Company. As an example of specific materials which may be used in an acousto-optic effect suppression arrangement according to the invention, when the crystal 10 is of GaAs of CdTe, a good acoustic impedance match is obtained when lead, lead glass or titanium is used for the acoustic energy absorbing slabs 14. As a further example, when the crystal 10 is of KDP or KD*P, a good acoustic impedance match is afforded with brass absorbing slabs 14.

In order to provide optimum coupling of acoustic energy into the absorbing slabs 14, a layer 16 of acoustic energy coupling material is interposed between each slab 14 and the adjacent face of the crystal 10 (or the adjacent electrically conductive layer 12). The acoustic energy coupling layers 16 may also function as a bonding agent which firmly bonds the absorbing slabs 14 to the crystal 10. When only an acoustic energy coupling function is desired, exemplary materials which may be used for the layer 16 are silicone grease and indium. When both acoustic energy coupling and bonding functions are desired, shellac may be employed as the coupling layer material.

In an exemplary process for bonding the acoustic energy absorbing slabs 14 to the crystal 10, the surfaces of the slabs 14 to be bonded to the crystal 10 are first heated to a temperature of around 100° C. and coated with shellac. The slabs 14 are then mounted in their desired assembled relationship about the crystal 10 and are held in this relationship by a clamping assembly. The clamped assembly is heated to a temperature of around 100° C. for a few minutes, after which the assembly is cooled to room temperature, allowing the shellac to harden and securely bond the slabs 14 to the crystal 10.

The spring-like consisting of the crystal 10, the slabs 14, and the coupling layers 16 may be mounted in a housing designated generally by the numeral 20. The housing 20 is preferably of a dielectric material such as fiber glass and may include a pair of longitudinal members 22a and 22b of generally semicylindrical configuration which may be attached to one another by means of screws 24 or the like. Housing members 22a and 22b are provided with respective inwardly projecting crystal assembly support portions 26a and 26b which define longitudinally extending openings 28a and 28b, respectively, of a stepped cross-sectional shape permitting accommodation of the crystal-slab assembly. The interior surfaces of housing members 22a and 22b also define a cylindrical cavity 30 adjacent one end of the housing 20. End plates 32 and 34 of a dielectric material such as fiber glass may be attached to the ends of the members 22a and 22b to complete the housing 20. Aligned apertures 36 and 38 in the respective housing end plates 32 and 34 expose the respective end faces of the crystal 10 to permit optical energy to traverse the crystal 10 in a longitudinal direction.

Electrical access to the crystal 10 may be afforded by spring-like conductors 40 which reside in the cavity 30 with one end in contact with the exposed portion of the adjacent electrically conductive layer 12. The other end of each conductor 40 may be attached to a screw 42 or the like which extends through the housing end plate 34 to provide a terminal for connection to an external electrical lead.

Figure 3B:
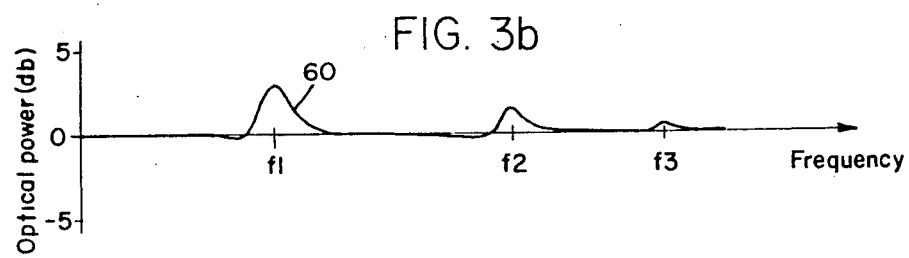

The results of the aforedescribed arrangement in achieving acousto-optic effect suppression in an electro-optic device may be seen from the curves of FIG. 3. Data for these curves was obtained by measuring the power level of a 10.6 micron laser beam which was passed through a GaAs crystal of dimensions 1 cm × 1 cm × 5 cm as a function of the frequency of an electric field applied across the crystal. Curve 50 of FIG. 3(a) illustrates the response when the crystal was undampened, i.e., with no acousto-optic effect suppression. It may be seen from FIG. 3(a) that a very sharp acousto-optic resonance occurs at essentially the frequency $f_1$, with smaller resonances occurring at the respective frequencies $f_2$ and $f_3$. Frequency $f_1$ corresponds to 200 kHz. frequency $f_2$ to 450 kHz. and frequency $f_3$ to 800 kHz. Curve 60 of FIG. 3(b) illustrates the optical power as a function of frequency for the same experimental arrangement as that used in generating data for the curve 50 of FIG. 3(a), but with the AGaAs crystal mechanically clamped to a holding fixture in accordance with prior art acousto-optic effect suppression techniques. It may be seen from FIG. 3(b) that the acousto-optic resonances at the respective frequencies $f_1$, $f_2$ and $f_3$, while of considerably smaller amplitude than their undampened value, are nevertheless still present to a significant degree.

Figure 3C:
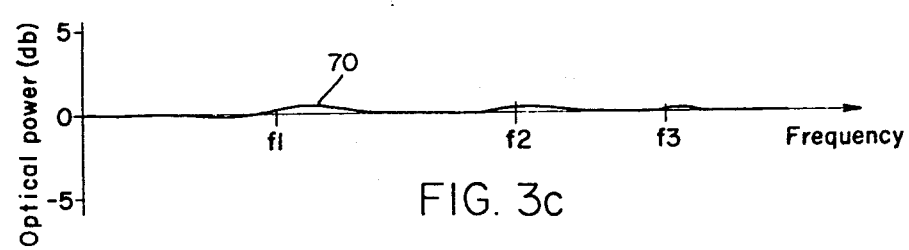

Curve 70 of FIG. 3(c) illustrates the optical power as a function of frequency for the same experimental arrangement as that used in generating data for the curves 60 and 70, but with a plurality of lead acoustic energy absorbing slabs 14 bonded to respective lateral faces of GaAs crystal 10 by means of respective layers 16 of shellac in accordance with a preferred embodiment of the invention as discussed above. As may be seen from FIG. 3(c), the present invention achieves almost complete suppression of the heretofore present acousto-optic resonances at the frequencies $f_1$, $f_2$ and $f_3$, and without impairing the electro-optic response characteristics of the crystal.

Although the present invention has been shown and described with reference to specific preferred arrangements, nevertheless various changes and modifications obvious to one skilled in the art to which the invention pertains are deemed to lie within the spirit, scope and contemplation in the invention.

We claim:

1. An electro-optic device comprising: a crystal of a material exhibiting the linear electro-optic effect, a plurality of bodies of acoustic energy absorbing material disposed adjacent to the respective lateral faces of said crystal, said bodies having an acoustic impedance substantially matching the acoustic impedance of said crystal, a layer of acoustic energy coupling material disposed between each said body and the adjacent lateral face of said crystal, and means for applying an electric field across said crystal between a pair of oppositely disposed lateral faces thereof.

2. An electro-optic device according to claim 1 wherein each of said bodies has a planar surface disposed parallel to the adjacent lateral face of said crystal.

3. An electro-optic device according to claim 1 wherein said crystal is of a material selected from the group consisting of gallium arsenide and cadmium telluride; said bodies are of a material selected from the group consisting of lead, lead glass, and titanium; and said layer is of a material selected from the group consisting of silicone grease and indium.

4. An electro-optic device comprising: a crystal of a material exhibiting the linear electro-optic effect, a plurality of bodies of acoustic energy absorbing material disposed adjacent to the respective lateral faces of said crystal, said bodies having an acoustic impedance of said crystal, a layer of acoustic energy coupling material disposed between each said body and the adjacent lateral face of said crystal and bonding said body to said crystal face, and means for applying an electric field across said crystal between a pair of oppositely disposed lateral faces thereof.

5. An electro-optic device according to claim 4 wherein each of said bodies has a planar surface disposed parallel to the adjacent lateral face of said crystal.

6. An electro-optic device according to claim 4 wherein said crystal is of a material selected from the group consisting of gallium arsenide and cadmium telluride; said bodies are of a material selected from the group consisting of lead, lead glass, and titanium; and said layer is of shellac.

7. An electro-optic device including means for suppressing the acousto-optic effect therein and comprising: an elongated crystal of a material exhibiting the linear electro-optica effect; said crystal having first, second, third, and fourth lateral faces; said first and second faces opposing one another; a layer of electrically conductive material disposed on each of said first and second lateral faces; first, second, third, and fourth bodies of a material having high acoustic energy absorption properties and having an acoustic impedance substantially matching the acoustic impedance of said crystal; said first and second bodies being respectively disposed adjacent to the electrically conductive layers on said first and second lateral faces; said third and fourth bodies being respectively disposed adjacent to said third and fourth lateral faces; each of said bodies having a planar surface disposed parallel to and substantially coextensive with the adjacent lateral face of said crystal, with said first and second bodies being dimensioned such that a small portion of each said electrically conductive layer is exposed; a layer of acoustic energy coupling material disposed between each of said first and second bodies and the adjacent electrically conductive layer and between said each of said third and fourth bodies and the adjacent lateral face of said crystal; a housing of dielectric material enclosing and supporting said bodies and said crystal in their assembled relationship; said housing including means for permitting optical energy to traverse said crystal in a longitudinal direction; and electrically conductive means extending through said housing and making electrical contact with the exposed portion of each said electrically conductive layer.

* * * * *

UNITED STATES PATENT OFFICE
CERTIFICATE OF CORRECTION

Patent No. 3,653,743      Dated April 4, 1972

Inventor(s) James E. Kiefer et al

It is certified that error appears in the above-identified patent and that said Letters Patent are hereby corrected as shown below:

Col. 1, line 68, "6b)" should be --(b)--.

Col. 2, line 45, "of" should be --or--;

Col. 2, line 72, after "The", delete "spring-like" and substitute therefor --assembly--.

Col. 3, line 42, "AGaAs" should be --GaAs--.

Col. 4, line 24, after "impedance" insert --substantially matching the acoustic impedance--.

Signed and sealed this 2nd day of January 1973.

(SEAL)
Attest:

EDWARD M. FLETCHER, JR.
Attesting Officer

ROBERT GOTTSCHALK
Commissioner of Patents